No. 775,475. PATENTED NOV. 22, 1904.
O. MEHNERT & P. PAPE.
FILTER.
APPLICATION FILED APR. 14, 1903.
NO MODEL. 4 SHEETS—SHEET 1.

Witnesses:
Carl Ruff.
Max Nescher

Inventors
Otto Mehnert.
Paul Pape.
Attorney.

No. 775,475. PATENTED NOV. 22, 1904.
O. MEHNERT & P. PAPE.
FILTER.
APPLICATION FILED APR. 14, 1903.
NO MODEL. 4 SHEETS—SHEET 4.

Witnesses
Emil Kayser
Paul Wollenberg

Inventors
Otto Mehnert
Paul Pape
by
Attorney

No. 775,475. Patented November 22, 1904.

UNITED STATES PATENT OFFICE.

OTTO MEHNERT AND PAUL PAPE, OF KÖTHEN, GERMANY, ASSIGNORS TO THE FIRM OF MASCHINENFABRIK AKTIEN-GESELLSCHAFT, VORM. WAGNER & CO., OF KÖTHEN, GERMANY.

FILTER.

SPECIFICATION forming part of Letters Patent No. 775,475, dated November 22, 1904.

Application filed April 14, 1903. Serial No. 152,587. (No model.)

*To all whom it may concern:*

Be it known that we, OTTO MEHNERT, a subject of the King of Saxony, and a resident of No. 2ª Baasderferstrasse, and PAUL PAPE, a subject of the Duke of Anhalt, and a resident of No. 2 Verlängerte, Baasderferstrasse, Köthen, Anhalt, Germany, have jointly invented certain new and useful Improvements in Filters, of which the following is an exact specification.

Our invention relates to improvements in filters, and more especially to filters to be used for filtering the waste liquids of paper and cellulose manufactories; and it has for its purpose to provide a filtering apparatus by means of which comparatively large quantities of waste liquids can be filtered and the filtering residue can easily be removed and utilized.

In order to make our invention more clear, we refer to the accompanying drawings, in which—

Figure 1:
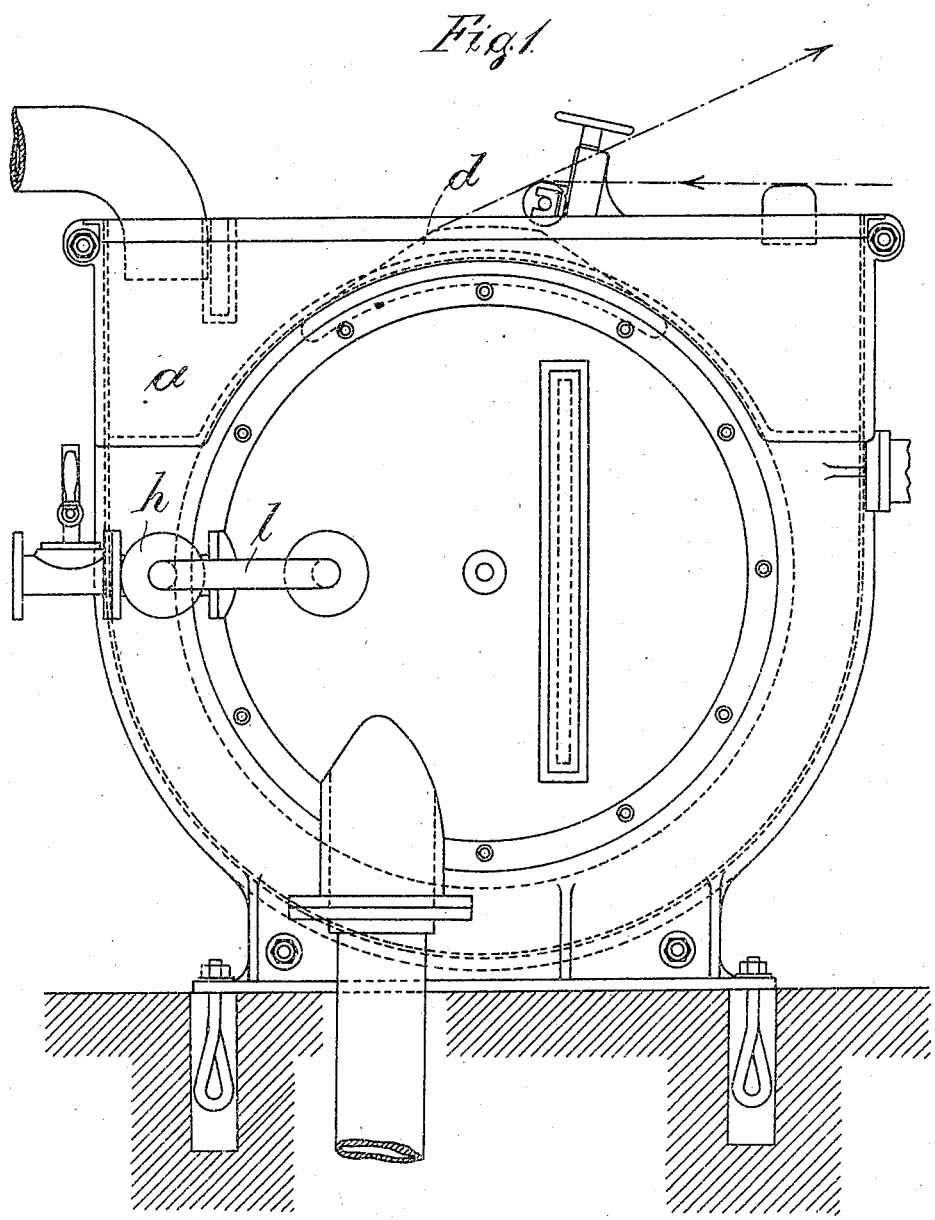
Figure 2:
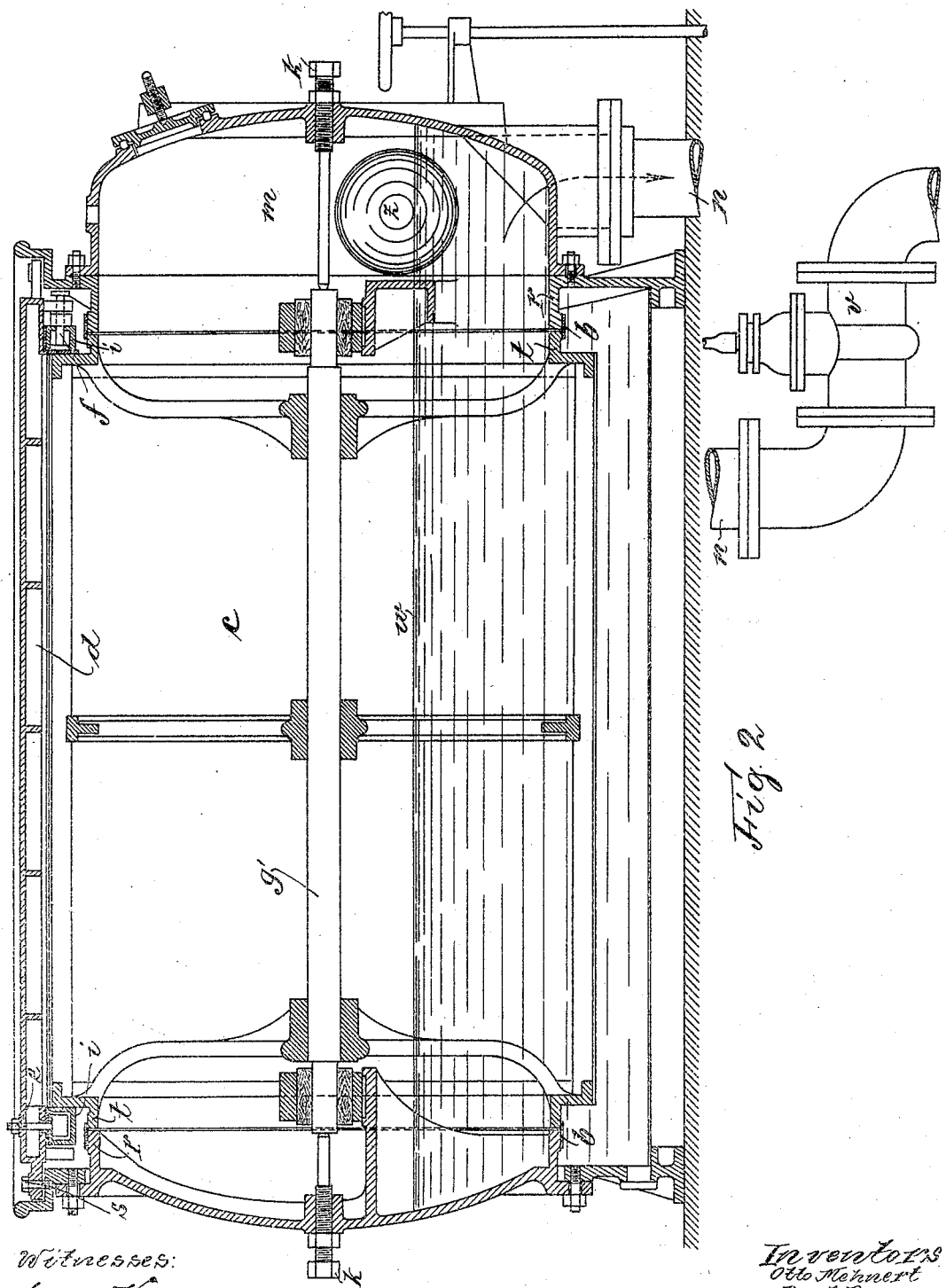
Figure 3:
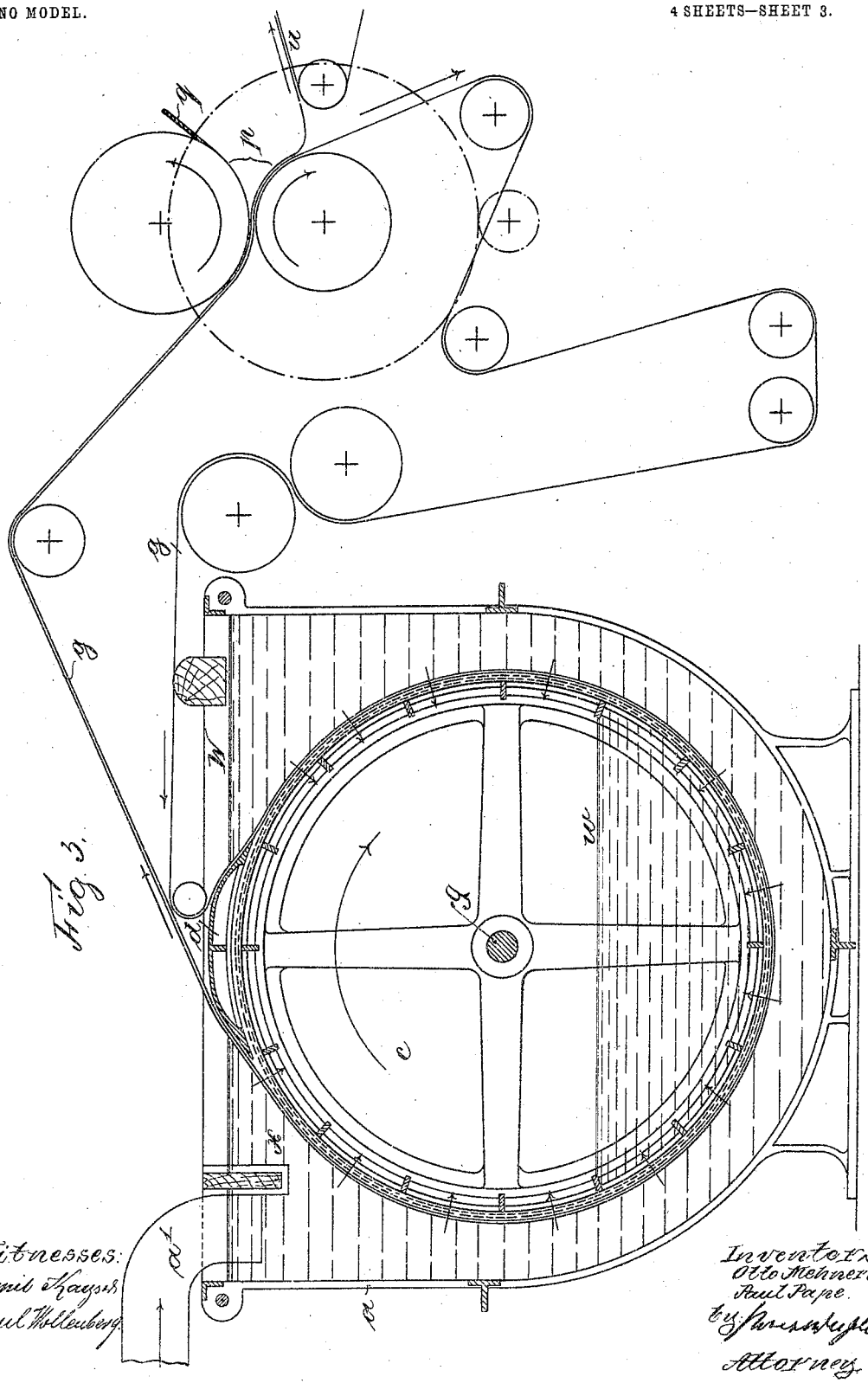
Figure 4:
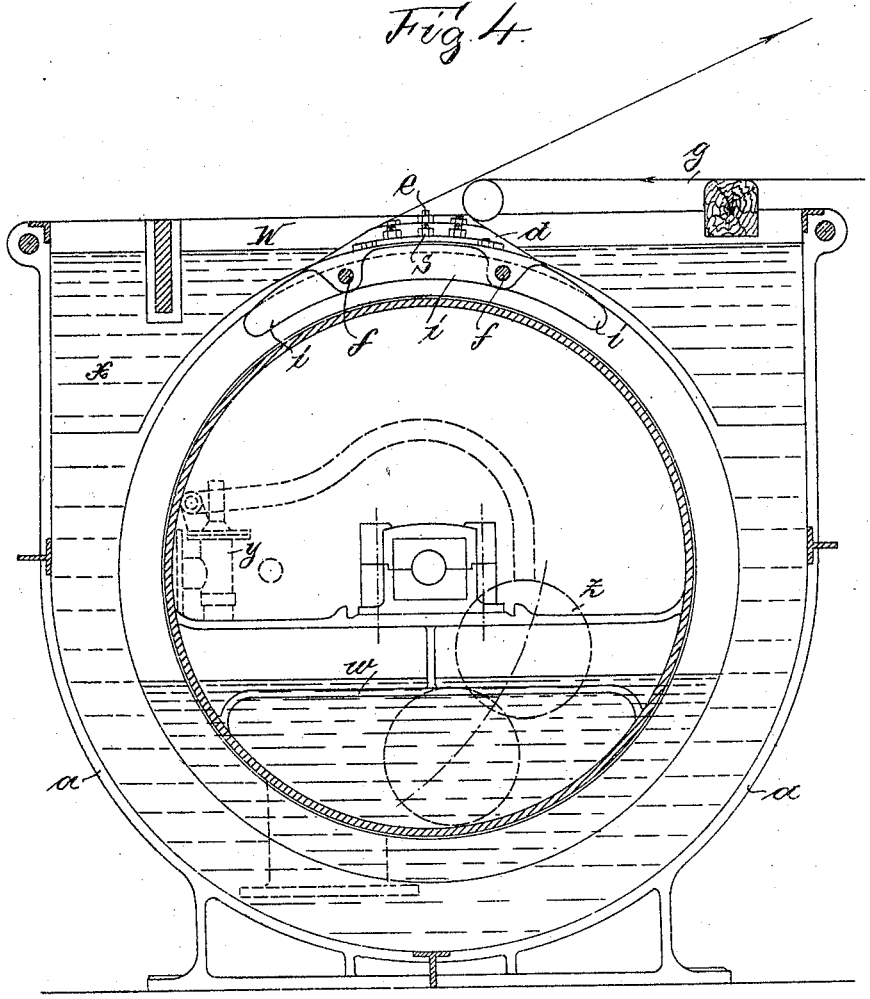

Figure 1 is a side view of the apparatus. Fig. 2 is a vertical longitudinal section of the same. Fig. 3 is a vertical cross-section and diagrammatic view of the device for leading the filtering residue to its place of destination; and Fig. 4 is a side view of the sieve-cylinder, showing the arrangement for tightening the same.

In the drawings, $a$ is a trough-shaped tank. In this tank a hollow cylinder $c$ is situated, manufactured of a wire webbing, perforated metal plates, or the like sieve material, which cylinder can be rotated around the axis $g'$. The cylinder $c$ is almost entirely surrounded by an endless band of filtering material—as, for instance, a suitable webbing, felt, or the like. At the smaller upper part, at which the cylinder is not covered by the endless band, an elastic cushion $d$ is situated, which cushion is pressed, by means of screws $s\ s\ s$, upon the periphery of the cylinder $c$. At the sides of the mantle of the cylinder $c$ elastic strips of tightening material $i$ are situated, which are pressed, by means of the screws $e$ and $f$, against the sides of the cylinder and against the tightening material $d$. It will be understood that any kind of elastic tightening material may be used; but advantageously rubber cushions or the like are used. It will be seen from Fig. 2 that in the tank $a$ inwardly-projecting annular rings $r$ are provided at both ends, the diameter of which rings corresponds to the diameter of the ends $t$ of the cylinder $c$. The cylinder $c$ is exactly fitted between the rings $r$, and rubber or the like rings $b\ b$ are provided for effecting an air-tight joint.

$k\ k$ are set-screws between which the axle of the cylinder $d$ is situated and by means of which the cylinder $c$ can be adjusted in the axial direction for the purpose of effecting a tightening of the joints.

For leading water into the cylinder $c$ a water-pipe $l$ is provided, which is connected, as shown in Fig. 1, to the side wall of the tank $a$, so that in consequence of the cylinder $c$ being open on both sides the water can flow through the pipe $l$ into the interior of the cylinder $c$. The pipe $l$ is provided with a valve $h$ for controlling the admission of water. At the same side of the water-inlet pipe $l$ a discharge-pipe $n$ is connected to the tank $a$. This pipe $n$ is fixed to the cup-shaped side wall $m$ of this tank, to which the pipe $l$ is also fixed. The interior of this cup-shaped side wall communicates naturally, as shown, with the interior of the cylinder $c$, so that in case the pipe $n$ is opened the water in the cylinder $c$ will be discharged through this pipe $n$. The pipe $n$ consists of two or more separate pipes shifted one into the other, so as to form a so-called "telescopic" pipe.

$v$ is a valve for opening and closing the pipe $n$.

Within the cup-shaped side wall $m$ of the tank $a$ a float $z$ is situated, which float controls a valve or cock $y$, situated at the end of the pipe $l$. The valve or cock $y$ is constructed so that in raising the float $z$ the water-inlet pipe $l$ is closed, whereas in lowering the float $z$ the water-inlet pipe $l$ is opened. In this way the level of the water inside the cylinder $c$ is adjusted.

The apparatus operates as follows: The waste liquid from the paper or cellulose manufacture is led through the pipe $a'$, Figs. 1 and 3, into the tank $a$, which is usually filled up to the level $w$. Through the pipe $l$ fresh water is led into the cylinder $c$. If now the valve $v$ in the telescope pipe $n$ is opened, the water in the cylinder $c$ flows out, producing a rarefaction of the air in the cylinder $c$. By this rarefaction of the air the liquid $x$ in the tank $a$ is drawn through the filtering material into the cylinder $c$. The filtering residue is retained upon the endless band $g$. For adjusting the level of the water $w$ inside the cylinder $c$ the floating body $z$, operating the valve or cock $y$, is provided.

It will be clear that the mouth of the telescope pipe $n$ must be situated under water and that by adjusting its length the vacuum in the cylinder $c$ can be adjusted.

As may be seen from Fig. 3, the endless band $g$ is guided between the pressing-rollers $p$, by means of which rollers this endless band $g$ is moved, and consequently the cylinder $c$ is rotated. The layer of filtering residue or fibers situated upon the endless band $g$ is pressed between the rollers $p$, removing the water still contained in the same. After passing the rollers $p$ the filtering residue is taken off and brought, by means of the apron $u$, to its place of destination. $q$ is a scraper for removing the adhering material from the upper roller $p$. After removing the filtering residue the endless band $g$ returns to the tank $a$ and serves again for filtering purposes.

Having thus fully described the nature of our invention, what we desire to secure by Letters Patent of the United States is—

1. In a filtering apparatus, the combination with a tank for taking up the liquid to be filtered, a hollow cylinder open on both ends and fitted between inwardly-projecting rings provided at the end walls of the tank, means for creating a vacuum in the cylinder and an endless belt of filtering material situated around the cylinder, and a tightening device covering that part of the cylinder not covered by the endless band of filtering material, so as to prevent air, dirt or the like from entering the vacuum-cylinder, substantially as described and for the purpose set forth.

2. In a filtering apparatus, the combination with a tank for taking up the liquid to be filtered, a hollow cylinder open on both ends and fitted between annular projecting rings fixed to the end walls of the tank, a water-inlet pipe connected to one end wall of the tank, a telescopic pipe fixed to one end wall of the tank, and an endless band of filtering material situated around the cylinder, substantially as described and for the purpose set forth.

3. In a filtering apparatus, the combination with a tank for taking up the liquid to be filtered, a hollow cylinder open on both ends and fitted between annular projecting rings fixed to the end walls of the tank, a water-inlet pipe connected to one end wall of the tank, a telescopic pipe fixed to one end wall of the tank, an endless band of filtering material situated around the cylinder, and means for tightening the joint between the annular projecting rings fixed to the end walls of the tank and the ends of the cylinder, substantially as described and for the purpose set forth.

4. In a filtering apparatus, the combination with a tank for taking up the liquid to be filtered, a hollow cylinder open on both ends and fitted between annular projecting rings fixed to the end walls of the tank, a water-inlet pipe connected to one end wall of the tank, a telescopic pipe fixed to one end wall of the tank, an endless band of filtering material situated around the cylinder, means for tightening the joint between the annular projecting rings fixed to the end walls of the tank and the ends of the cylinder, and a tightening material covering that part of the cylinder not covered by the endless band of filtering material, substantially as described and for the purpose set forth.

In testimony whereof we have signed our names to this specification in the presence of two subscribing witnesses.

OTTO MEHNERT.
PAUL PAPE.

Witnesses:
RICH. REIMANN,
P. V. C. DUNN.